Dec. 16, 1952          J. R. BETZ          2,621,379
CENSER
Filed Nov. 4, 1950
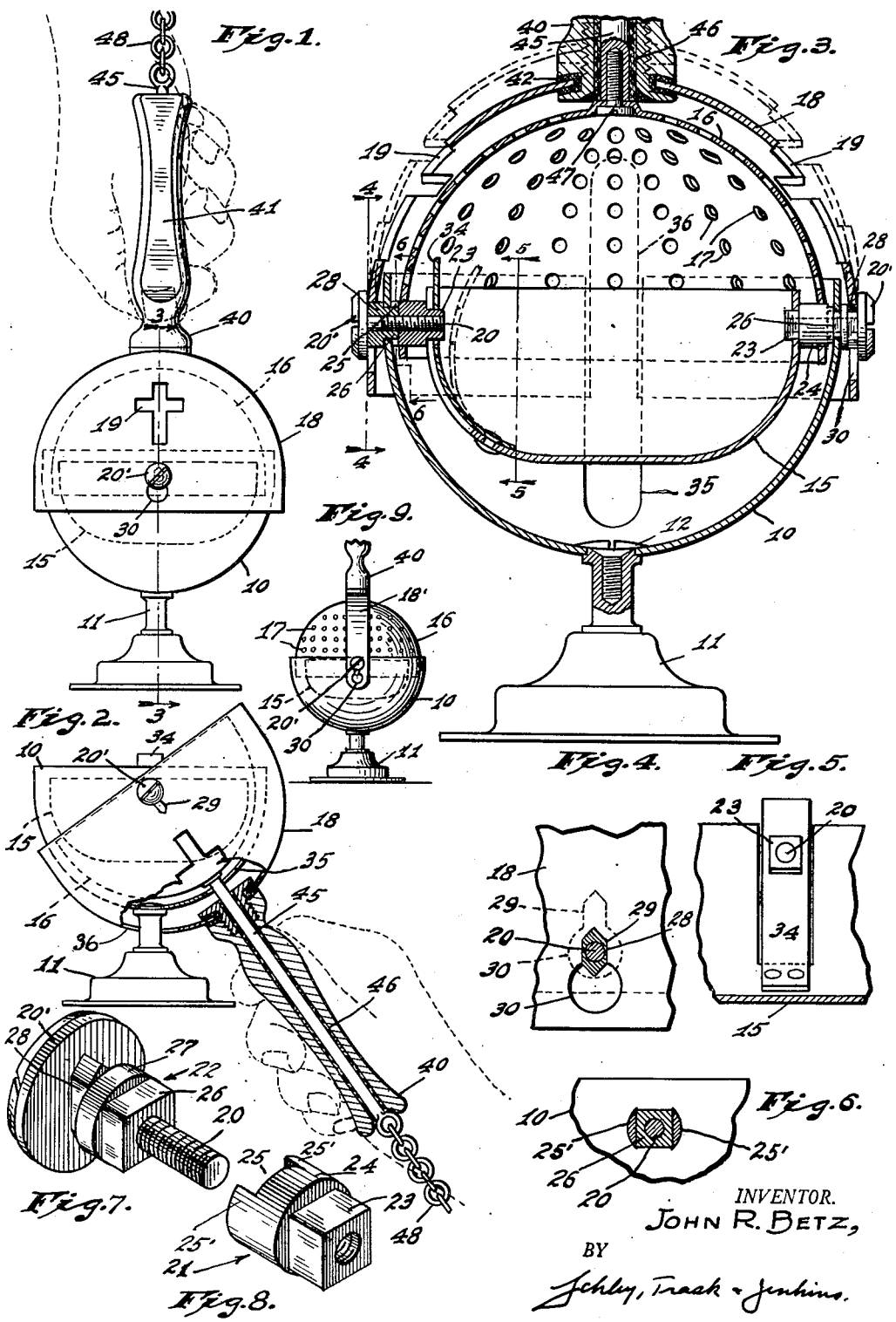
INVENTOR.
JOHN R. BETZ,
BY
Schley, Trask & Jenkins
ATTORNEYS.

Patented Dec. 16, 1952

2,621,379

UNITED STATES PATENT OFFICE 2,621,379

CENSER

John R. Betz, Sunman, Ind.

Application November 4, 1950, Serial No. 194,120

16 Claims. (Cl. 21—116)

It is the object of my invention to provide a censer which is easily and conveniently and safely handled for all the operations desired of a censer; and particularly to provide a single-chain censer which can be carried safely and swung freely without danger of coming open or of spillage, but can be opened and closed easily to insert charcoal and incense, with one-hand support and operation, and with substantially no danger to priest or acolyte or vestments or of spillage of live coals or incense; and to do all this with a simple and inexpensive construction.

The accompanying drawing illustrates my invention. In such drawing:

Fig. 1 is an elevation of a censer embodying a preferred form of my invention, in closed position, showing in dotted lines an acolyte's hand in operating position on the manipulating handle; Fig. 2 is another elevation of the same censer, with the censer open and with some parts broken away, and again with an acolyte's hand shown in dotted lines in operating position on the handle; Fig. 3 is an enlarged vertical section, substantially on the line 3—3 of Fig. 1; Figs. 4, 5, and 6 are fragmental sections on the lines 4—4, 5—5, and 6—6, respectively, of Fig. 3; Figs. 7 and 8 are isometric views of one of the pivot-pins carrying its separate positioning-trunnion member, and of its cooperating nut, respectively; and Fig. 9 is a fragmental view showing a modification of the structure shown in Fig. 1, but in which a bail is used instead of the outer dome.

The censer has a lower body-part and an upper body-part normally in fixed closed relation to each other as shown in Figs. 1 and 3, but capable of pivoting one on the other to open the censer as shown in Fig. 2 for inserting charcoal and incense and for removing ashes and cleansing. Each of these two body-parts has outer and inner members.

The outer member 10 of the lower body-part of the censer is a cup, conveniently approximately hemispherical in shape; and is desirably provided with a pedestal 11 suitably attached to it, as by a screw 12, to provide both support and centering weight.

The inner member 15 of the lower body-part is the fire-pot, also cup-shaped, spaced from and fixed concentric with the outer cup 10 when in use, but removably supported in place as described hereinafter. The fire-pot 15 holds the charcoal and incense.

The inner member 16 of the upper body-part is the normal carrying member, an arched bail on which the other body-members are hung. It is desirably a hemispherical dome having a radius greater than that of the fire-pot 15 but less than that of the outer cup 10. This inner dome 16 normally covers the fire-pot 15, and is normally vertically coaxial therewith, as indicated in Figs. 1 and 3; and has many perforations 17 for ventilation and for the escape of the smoke. By mechanism hereinafter described this perforated inner dome 16 may be swung as a bail around its transverse axis from the position shown in Fig. 1 to the position shown in Fig. 2, to give access to the interior of the censer, and particularly to the fire-pot 15; so that it acts in part as an arched carrying bail to support the lower body-part of the censer, and in part as a cup to catch any spilled coals when the censer is opened or if it is overturned.

The outer member of the upper body-part is permissibly in the form of a bail 18', as is shown in Fig. 9; but is preferably in the form of an outer dome 18. Although this outer dome 18 may be of any desired shape, ornamental or symbolic, it is preferably of a generally hemispherical shape approximately concentric with but slightly larger in diameter than the outer cup 10, as is shown in Figs. 1, 2, and 3, so that it will clear that outer cup as it is swung from its normal closed position shown in Figs. 1 and 3 to the open position shown in Fig. 2.

This outer dome 18 becomes a supplemental cup when in open position, to catch any spilled coals. It may be provided with perforations 19, of symbolic shape (such as the cross) if desired, to facilitate escape of the smoke.

While either member of the upper body-part may be a simple bail, such as the handle of a bucket pivoted at both ends to the body of the bucket as the outer member is shown in Fig. 9, it is desirable that at least one be in the form of a dome or inverted cup. By the term "bail" or "bail-member" I mean a member pivoted on a single axis to the lower body-part at two separated points, as is the aforesaid handle of a bucket.

The outer cup 10, the fire-pot 15, the inner dome 16, and the outer dome 18 (or bail 18'), are all conveniently made of sheet metal, such as aluminum (anodized if desired), copper, brass, bronze, iron (lacquered or otherwise treated if desired), or even silver or gold; but any or all of them may be made of cast metal, and the shapes of the outer cup 10 and of the outer dome 18 may be varied in design as desired.

The pivotal interconnection between the upper and lower body-parts is provided by two opposite alined pivot-pins 20, one of which with its cooperating parts is shown in isometric projection in Figs. 7 and 8 and in various sections in Figs. 3, 4, 5, and 6. Each pivot-pin itself is a simple screw-threaded bolt, with a large head 20' having a screw-driver slot. Each pivot-pin 20 is provided with a special nut 21, shown in Fig. 8; and with a slidable positioning-trunnion member 22 located between the head 20' and the nut 21 and shown in Fig. 7 in position on the pivot-pin.

Each nut 21 has a square portion 23 which fits into one of two rectangular holes on opposite sides of the fire-pot 15, and a round portion 24 which rotatably fits into one of two holes (conveniently round holes) on opposite sides of the inner dome 16 to serve as a pivotal support for that inner dome. The round portion 24 has a transverse groove 25 extending across its end face, to provide two flanking fingers 25'. The positioning-trunnion member 22 has a square portion 26 which fits into the transverse groove 25 between the fingers 25' to lock the nut and trunnion member together against relative angular movement. It also has a somewhat larger abutment portion 27, conveniently round, next to the square portion 26; and a flat-sided locking portion 28 on the other side of the abutment portion 27 from the square portion 26 and in position to lie against the under face of the head 20' of the pivot pin 20. Each square portion 26 fits into one of two square holes at opposite sides of the outer cup 10, which is clamped in place on that square portion 26 between the abutment portion 27 and the nut-fingers 25' by screwing the pivot-pin home with a screw-driver or coin. Thus when the pivot-pin 20 is screwed tight the nut 21 and the positioning-trunnion member 22 are fixed angularly with relation to each other and to both the outer-cup 10 and the fire-pot 15, and the square portions 23 and 26 are in angular alinement.

The outer dome 18 (or bail 18') has two inverted keyholes at its opposite sides, to cooperate with the locking member 28 of the trunnion member 22. Each of these keyholes has a flat-sided upper portion 29 for fitting lockingly on the flat-sided portion 28 of the positioning-trunnion member, and a round lower portion 30 which is large enough to turn on that flat-sided locking portion 28. The outer dome 18 may be moved up and down—down to lock it in place by the cooperation of the flat-sided portions 29 and 28, and up to unlock it by separating those flat-sided portions and bringing the round portion 30 into rotatable position on that locking portion 28. The flat-sided locking portion 28 is desirably tapered at at least one end, and preferably at both ends so that either end may be uppermost, to guide the lowering of the outer dome into locking position after such outer dome has been raised for opening the censer; and the upper end of the flat portion 29 of each keyhole may be similarly tapered.

The two pivot-pins 20 with the nuts and trunnion-members are thus fixed in the lower body-part (the outer cup 10 and fire-pot 15), and are on opposite ends of a common horizontal diameter of the four parts 10, 15, 16, and 18. When the outer dome 18 is down, the upper and lower body-parts are held against relative turning; but when that outer dome is lifted, the upper body-part (the two domes 16 and 18) can swing as a unit upon the axis of the pivot-pins relative to the lower body-part (the outer cup 10 and the fire-pot 15) between the positions shown in Figs. 1 and 2.

The fire-pot 15 is desirably removable. To this end, it is slotted at one side, and a spring-tongue 34 is mounted in that slot. The spring-tongue desirably projects above the upper edge of the fire-pot, and one of the rectangular holes receiving the square portions 23 of the nuts 21 is in this spring-tongue 34. This spring-tongue 34 may be sprung inward by finger pressure, to release the fire-pot 15 and permit its removal and replacement. When the fire-pot is in place, it is held from turning on the axis of the pivot-pins and with respect to the outer cup 10 by the square portions 23 and the rectangular holes cooperating with them.

As already noted, when the dome 18 (or bail 18') is in lower position with respect to the pivot-pins, as is shown in Figs. 1 and 2 and in full lines in Fig. 4, the upper body-part is locked against turning on the pivot-pins and with respect to the lower body-part; and when the dome 18 (or bail 18') is raised with respect to the pivot pins, as is shown in dotted lines in Fig. 4, so that the locking portions 28 and 29 are out of engagement, the upper body-part then may be turned as a unit on the pivot-pins to the position shown in Fig. 2. To make this turning possible, the outer cup 10 and the outer dome 18 are provided with slots 35 and 36, on one or both sides if desired, to receive respectively a rod 45 (fixed to the inner dome 16 as will shortly be described) and the stem of the pedestal 11.

The dome 18 (or bail 18') is provided at the top, 90° from the pivot-pins 20, with a manipulating handle 40, which can be grasped by the acolyte, or by the priest on occasion, to open and close the censer. The handle 40 may be made of metal (for instance aluminum), wood, or plastic, of convenient shape; and is desirably provided on at least one side (or on each of two opposite sides) with a flattened portion 41 for the acolyte's thumb or hand to rest upon to "feel" for proper positioning of the censer by touch, as is indicated in Figs. 1 and 2, which show the acolyte's hand in dotted lines. If the handle is of metal, desirably it has a heat-insulating mounting on the outer dome 18, as by interposed heat-insulation 42.

The handle 40 has an axial hole through it, through which extends a rod 45 (already referred to) on which the handle is slidable. A heat-insulating tube 46 preferably surrounds the rod 45 to separate the handle 40 from contact with it, especially when the handle is made of metal or other heat-conductor, to keep the handle from getting too hot to grasp. At its lower end the rod 45 is attached, as by a screw 47, to the perforated inner dome 16; and at its upper end it is attached to a carrying chain 48, by which the censer is hung so that it may be swung as needed by the priest or by the acolyte.

In operation the censer is normally carried by the chain 48, by which it may be swung as required. When so carried the parts are as shown in Figs. 1 and 3, and the outer dome 18 and the handle 40 are in lower position so that the upper part of the censer is held against coming open by the engagement of the flat-sided locking portions 28 in the flat-sided slots 29. The smoke of the incense escapes through the perforations in the domes 16 and 18, and through the slots 36, and around the lower edges of the outer dome 18.

When it is desired to open the censer, as to insert charcoal and incense, the acolyte grasps the handle 40 with one hand, and lets the chain 48 (held by his other hand) slacken. That lowers the rest of the censer relatively to the handle 40 and outer dome 18, and so releases the locking engagement of the flat-sided locking portions 28 of the pivot-pins in the flat-sided slots 29. The acolyte now tilts the handle 40 downward from the position of Fig. 1 to the position of Fig. 2, meanwhile supporting the censer by that handle.

The whole upper part of the censer tilts with the handle; but the whole lower part remains untilted, because of its depending weight (including the weight of the pedestal 11).

The acolyte holds the censer in open position, by one hand grasping the tilted handle 40, as charcoal or incense or both are inserted. Then he tilts the handle back to the vertical position of Fig. 1 to close the censer, and releases the handle while resuming the chain support of the censer, so that the outer dome 18 will descend relatively to locking position, with the flat-sided locking portions 28 in the slots 29. If any live coals or ashes or incense are spilled from the fire-pot 15, they are caught in the cups formed by the partly inverted dome 16, and returned to the fire-pot as the domes are returned to closed position.

When desired the censer may be disassembled and reassembled easily. To disassemble it the two pivot-pins 20 are simply unscrewed; and all the parts then can readily be separated. To reassemble it the parts are put back into position easily, and tightened by screwing the pivot-pins 20 into place.

But the need for disassembling is rare. For ordinary cleaning it is often sufficient merely to open the censer and empty out the debris; while for more thorough cleaning it is sufficient to open the censer and lift out the fire-pot, by releasing the spring-finger 34.

I claim as my invention:

1. A censer, comprising a lower cupped body-part including a fire-pot, an arched carrying bail pivoted to the lower body-part at opposite sides thereof on a transverse axis, a carrying chain attached to said carrying bail, and a swingably mounted covering dome swingable on said lower body-part with the carrying bail to cover and to give access to the fire-pot as desired, said dome having a locking connection to said lower body-part.

2. A censer, comprising a lower cupped body-part including a fire-pot, an arched carrying bail pivoted to the lower body-part at opposite sides thereof on a transverse axis, a carrying chain attached to said carrying bail, and a swingably mounted covering dome swingable on said lower body-part with the carrying bail to cover and to give access to the fire-pot as desired, said dome being movable on said carrying bail lengthwise of the chain, and a locking device between said dome and the lower body-part operable by said last-named movement.

3. A censer, comprising a lower cupped body-part including a fire-pot, an arched carrying bail pivoted to the lower body-part at opposite sides thereof on a transverse axis, a carrying chain attached to said carrying bail, and a swingably mounted covering dome swingable on said lower body-part with the carrying bail to cover and to give access to the fire-pot as desired, said dome being movable on said carrying bail, and a locking device between said dome and the lower body-part operable by said last-named movement.

4. A censer, comprising a lower cup, a removable fire-pot in said lower cup, a dome pivoted upon and movably supporting said lower cup and movable both to covering and uncovering positions and lockable in covering position, and a carrying chain attached to said dome.

5. A censer, comprising upper and lower body-parts pivoted together diametrically, said lower body-part including a fire-pot, and said upper body-part including both a carrying bail for the lower body-part and a locking member movable on the carrying bail to lock and unlock the two body-parts against turning on the pivotal axis between the two body-parts, said carrying bail including a rod fixed on it for attachment to a supporting chain, and said locking member having a manipulating handle loosely surrounding and slidable on said rod to move the locking member to locking and unlocking positions and to support the censer when the handle is held and the chain is slackened.

6. A censer, comprising a lower body-part including an outer cup and a fire-pot within it, and an upper body-part including inner and outer domes pivoted to the lower body-part, said two domes having such dimensions that as the upper body-part is swung on the lower body-part the inner dome moves between the outer cup and the fire-pot and the outer dome moves outside the outer cup.

7. A censer, comprising a lower body-part including an outer cup and a fire-pot within it, and an upper body-part including inner and outer bail-members pivoted to the lower body-part, said two bail-members having such dimensions that as the upper body-part is swung on the lower body-part the inner bail-member moves between the outer cup and the fire-pot and the outer bail-member moves outside the outer cup.

8. A censer, comprising a lower body-part including an outer cup and a fire-pot within it, and an upper body-part including inner and outer bail-members pivoted to the lower body-part, said two bail-members having such dimensions that as the upper body-part is swung on the lower body-part the inner bail-member moves between the outer cup and the fire-pot and the outer bail-member moves outside the outer cup, at least one of said bail-members being in the form of a dome.

9. A censer, comprising a lower body-part including an outer cup and a fire-pot removably fixed within it, and an upper body-part including inner and outer domes pivoted to the lower body-part, said two domes having such dimensions that as the upper body-part is swung on the lower body-part the inner dome moves between the outer cup and the fire-pot and the outer dome moves outside the outer cup.

10. A censer, comprising, a lower body-part including an outer cup and a fire-pot within it, an upper body-part including inner and outer domes pivoted to the lower body-part, said two domes having such dimensions that as the upper body-part is swung on the lower body-part the inner dome moves between the outer cup and the fire-pot and the outer dome moves outside the outer cup, a supporting pedestal attached to the outer cup, an operating handle rigid with said outer dome, and a supporting member extending through said handle and attached to the inner dome, said outer cup and said outer dome being provided with slots in the plane perpendicular to the pivotal axis for permitting the supporting member and the pedestal to enter as the two body-parts are swung on each other.

11. A censer, comprising a lower body-part including an outer cup and a fire-pot within it, an upper body-part including inner and outer domes pivoted to the lower body-part, said two domes having such dimensions that as the upper body-part is swung on the lower body-part the inner dome moves between the outer cup and the fire-pot and the outer dome moves outside the outer cup, a supporting pedestal attached to the outer cup, an operating handle rigid with said outer dome, and a supporting member attached to the inner dome, said outer cup and said outer dome being provided with slots in the plane perpendicular to the pivotal axis for permitting the supporting member and the pedestal to enter as the two body-parts are swung on each other.

12. A censer, comprising a lower body-part including an outer cup and a fire-pot within it, an upper body-part including inner and outer domes pivoted to the lower body-part, said two domes having such dimensions that as the upper body-part is swung on the lower body-part the inner dome moves between the outer cup and the fire-pot and the outer dome moves outside the outer cup, an operating handle rigid with said outer dome, and a supporting member extending through said handle and attached to the inner dome, said outer cup being provided with a slot in the plane perpendicular to the pivotal axis for permitting the supporting member to enter as the two body-parts are swung on each other.

13. A censer, comprising a lower body-part including an outer cup and a fire-pot within it, an upper body-part including inner and outer domes pivoted to the lower body-part, said two domes having such dimensions that as the upper body-part is swung on the lower body-part the inner dome moves between the outer cup and the fire-pot and the outer dome moves outside the outer cup, an operating handle rigid with said outer dome, and a supporting member attached to the inner doom, said outer cup being provided with a slot in the plane perpendicular to the pivotal axis for permitting the supporting member to enter as the two body parts are swung on each other.

14. A censer, comprising a lower body-part including an outer cup and a fire-pot within it, an upper body-part including inner and outer domes pivoted to the lower body-part, said two domes having such dimensions that as the upper body-part is swung on the lower body-part the inner dome moves between the outer cup and the fire-pot and the outer dome moves outside the outer cup, an operating handle rigid with said outer dome, and a supporting rod attached to said inner dome for attachment to a carrying chain and on which said handle is slidable to move the outer dome along said rod, there being between said upper and lower body-parts a locking device operable by said sliding movement to lock the upper body-part against and unlock it for pivotal movement on the lower body-part.

15. A censer, comprising a lower body-part including an outer cup and a fire-pot within it, and an upper body-part including inner and outer domes pivoted to the lower body-part, said two domes having such dimensions that as the upper body-part is swung on the lower body-part the inner dome moves between the outer cup and the fire-pot and the outer dome moves outside the outer cup; the pivotal connection between the two body-parts comprising two opposite alined pivot-pins, at least one of said pivot-pins carrying both a nut and a positioning-trunnion member interlocking with each other and held in place on the pivot-pin by said nut, one of said body-parts having a fixed mounting on said nut and said trunnion member, and the other body-part having a rotatable engagement on both said nut and said trunnion member and a releasable lock against said rotation.

16. A censer, comprising a lower body-part including an outer cup and a fire-pot within it, and an upper body-part including inner and outer bail-members pivoted to the lower body-part, said two bail-members having such dimensions that as the upper body-part is swung on the lower body-part the inner bail-member moves between the outer cup and the fire-pot and the outer bail-member moves outside the outer cup; the pivotal connection between the two body-parts comprising two opposite alined pivot-pins, at least one of said pivot-pins carrying both a nut and a positioning-trunnion member interlocking with each other and held in place on the pivot-pin by said nut, one of said body-parts having a fixed mounting on said nut and said trunnion member, and the other body-part having a rotatable engagement on both said nut and said trunnion member and a releasable lock against said rotation.

JOHN R. BETZ.

REFERENCES CITED

The following references are of record in the file of this patent:

UNITED STATES PATENTS

| Number | Name | Date |
|---|---|---|
| 2,530,529 | Le Tang | Nov. 21, 1950 |